United States Patent [19]

Murata et al.

[11] Patent Number: 6,084,058
[45] Date of Patent: Jul. 4, 2000

[54] COMPOSITION FOR LIQUID CRYSTAL ALIGNING FILM, LIQUID CRYSTAL ALIGNING FILM, LIQUID CRYSTAL DISPLAYS AND LIQUID CRYSTAL DISPLAY ELEMENT

[75] Inventors: Shizuo Murata, Ichihara; Toshiya Sawai, Chiba; Satoshi Tanioka; Haruo Kato, both of Ichihara, all of Japan

[73] Assignee: Chisso Corporation, Osaka, Japan

[21] Appl. No.: 09/142,559

[22] PCT Filed: Dec. 24, 1997

[86] PCT No.: PCT/JP97/04763

§ 371 Date: Sep. 11, 1998

§ 102(e) Date: Sep. 11, 1998

[87] PCT Pub. No.: WO98/31725

PCT Pub. Date: Jul. 23, 1998

[30] Foreign Application Priority Data

Jan. 16, 1997 [JP] Japan ..................................... 9-017827

[51] Int. Cl.[7] .............................. C08G 73/10; G02F 1/13
[52] U.S. Cl. ......................... 528/353; 528/125; 528/128; 528/172; 528/173; 528/174; 528/176; 528/183; 528/185; 528/220; 528/229; 528/350; 428/1; 428/473.5; 349/1; 349/19; 349/122; 349/123; 349/124; 349/127; 349/131; 349/139; 349/158
[58] Field of Search ..................................... 528/125, 128, 528/172–173, 174, 176, 183, 185, 220, 229, 350, 353; 349/1, 19, 123, 122, 124, 127, 131, 139, 158; 428/473.5, 1

[56] References Cited

U.S. PATENT DOCUMENTS 5,571,579  11/1996  Kato et al. ................................ 359/36

FOREIGN PATENT DOCUMENTS

| 0-729-996 | 9/1994 | European Pat. Off. . |
| 0-718-666 | 6/1996 | European Pat. Off. . |
| 0-725-302 | 8/1996 | European Pat. Off. . |
| 61-47932 | 3/1986 | Japan . |
| 61-205924 | 9/1986 | Japan . |
| 62-297819 | 12/1987 | Japan . |
| 4-057027 | 2/1992 | Japan . |
| 4-57027 | 2/1992 | Japan . |
| WO 97/24640 | 7/1997 | WIPO . |

*Primary Examiner*—P. Hampton-Hightower
*Attorney, Agent, or Firm*—McDermott, Will & Emery

[57] ABSTRACT

A composition for a polyimide type liquid crystal aligning film characterized in that a diamino compound constituting polyimide contains one, two or more diamine selected from 4,4'-diaminodiphenyl methane, 3,3'-dimethyl-4,4'-diaminodiphenyl methane, 2,2'-dimethyl-4,4'-diaminodiphenyl methane, 3,3',5,5'-tetramethyl-4,4'-diaminodiphenyl methane and 4,4'-ethylene di-meta-toluidine.

5 Claims, No Drawings

COMPOSITION FOR LIQUID CRYSTAL ALIGNING FILM, LIQUID CRYSTAL ALIGNING FILM, LIQUID CRYSTAL DISPLAYS AND LIQUID CRYSTAL DISPLAY ELEMENT

TECHNICAL FIELD

The present invention relates to a composition for a liquid crystal aligning film, as well as a liquid crystal aligning film, a liquid crystal displays and a liquid crystal display element obtained by using the said composition.

BACKGROUND ART

A STN (super twist nematic) mode, a TFT mode and an IPS mode have been used in liquid crystal display elements for large-sized displays useful in notebook-type personal computers and word processors etc. Polyimide type materials having various constitutions have been proposed as aligning films useful for them (Japanese Patent Application Laid-open Nos. 61-205924 and 62-297819).

However, superior characteristics have been required increasingly heretofore as to liquid crystal aligning films with recent improvements in characteristics of liquid crystal displays.

Liquid crystal aligning films have been hitherto required to have superior electro-optic characteristics such as good aligning property and high voltage holding ratio etc., and in recent years fine Vth unevenness formed with in a display plane has become an issue, as liquid crystals having high dielectric anisotropy have been used for lowering of crystal driving voltage. In particular, there occurs phenomenon that water washed traces remain as Vth unevenness when water washing being carried out in order to remove dust formed during rubbing of aligning films, so that, conventional liquid crystal aligning films cannot been said sufficient for decreasing the phenomenon.

As an example of aligning films from which high quality liquid crystal display elements being obtained, there has been proposed a polyimide aligning film which is obtained from 4,4'-diaminodiphenyl methane and cyclobutane tetracarboxylic dianhydride in Japanese Patent Publication No. 4-33010. The main component of the film is polyimide resin in which at least 90 mol % of repeated units in polyimide being constituting units expressed by formula

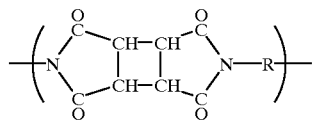

wherein R denotes divalent aromatic hydrocarbon radical, and the film is superior in its transparency and heat resistance. Therein, 4,4'-diaminodiphenyl methane is said to be effective as diamine.

Further, in Japanese Patent Application Laid-open No. 4-57027, it was disclosed that by using polyimide with poly-condensed structure of a cyclobutane tetracarboxylic dianhydride component and a 4,4'-diaminodiphenyl methane component as an aligning film, the film has a high voltage holding ratio and is suitable for an active matrix type liquid crystal display device.

However, in the case that a substrate of liquid crystal display element is washed with water in order to remove impurities adhered on a surface of an aligning film during preparation of the liquid crystal element, there is a problem that faint washing traces remain at the time of lightening the entire screen of the said liquid crystal display element in intermediate tone. In particular, washing traces remain clear in the case that liquid crystals with high dielectric constant being used.

A problem to be solved by the invention is to propose a composition for a liquid crystal aligning film having characteristics hitherto required for an aligning film, such as good aligning property, high voltage holding property and no water washing unevenness when water washing being carried out; a liquid crystal aligning film formed therefrom; as well as a liquid crystal displays and a liquid crystal display element with use of them.

DISCLOSURE OF INVENTION

We inventors have taken the problems in the above-mentioned conventional techniques into consideration and studied eagerly to find that use of the particular polyimide as a liquid crystal aligning film is very effective for dissolving the problems and attain the present invention.

That is, the present invention consists of a composition for a polyimide type liquid crystal aligning film characterized in that a diamino compound constituting polyimide contains one, two or more diamine(s) selected from 4,4'-diaminodiphenyl methane, 3,3-dimethyl-4,4'-diaminodiphenyl methane, 2,2'-dimethyl-4,4'-diaminodiphenyl methane, 3,3'5,5'-tetramethyl-4,4'-diaminodiphenyl methane and 4,4'-ethylene-di-meta-toluidine. Amongst them, it is more preferable to use 2,2'-dimethyl-4,4'-diaminodiphenyl methane and 4,4'-ethylene di-meta-toluidine since viscosity during polymerization tends to increase.

Further, the invention consists of a composition for a liquid crystal aligning film characterized in that tetracarboxylic dianhydride constituting polyimide according to claim 1 contains more than 20 mol % of cyclobutane tetracarboxylic dianhydride.

Also, the invention consists of a liquid crystal aligning film which is formed from the said composition, as well as a liquid crystal displays and a liquid crystal display element both having the said liquid crystal aligning film.

Causes of Vth unevenness has not been clear, but it seems that water absorbed during water washing remains slightly in a liquid crystal aligning film due to difference in water absorptance of the liquid crystal aligning film and that Vth unevenness is formed under the influence of it as if the water traces remain.

PREFERRED EMBODIMENT

As diamine useful in the invention, there is (are) used one, or combination of two or more diamine(s) selected from 4,4'-diaminodiphenyl methane, 3,3'-dimethyl-4,4'-diaminodiphenyl methane, 2,2'-dimethyl-4,4'-diaminodiphenyl methane, 3,3',5,5'-tetramethyl-4,4'-diaminodiphenyl methane and 4,4'-ethylene di-meta-toluidine.

The sum of these compounds to be used is preferably 20 mol % or more and more preferably 50 mol % or more.

Compounds which can be used as diamine other than above-mentioned ones are exemplified as follows: 2,2-bis[4-(4-aminophenoxy)phenyl]propane, 2,2-bis[4-(4-aminophenoxy)phenyl]hexafluoropropane, m-phenylene diamine, p-phenylene diamine, m-xylylene diamine, p-xylylene diamine, 2,2'-diaminodiphenyl propane, 4,4'- diaminodiphenyl ether, benzidine, 1,1-bis[4-(4-aminophenoxy)phenyl]cyclohexane, 1,1-bis[4-(4-aminophenoxy)phenyl]-4-methyl cyclohexane, 1,1-bis[4-(4-aminophenoxy)phenyl]-4-ethyl cyclohexane, 1,1-bis[4-(4-aminophenoxy)phenyl]-4-propyl cyclohexane, 1,1-bis[4-(4-aminophenoxy)phenyl]-4-butyl cyclohexane, 1,1-bis[4-(4-aminophenoxy)phenyl]-4-pentyl cyclohexane, bis[4-(4-aminobenzyl)phenyl]methane, 1,1-bis[4-(4-aminobenzyl)phenyl]cyclohexane, 1,1-bis[4-(4-aminobenzyl)phenyl]4-methylcyclohexane, 1,1-bis[4-(4-aminobenzyl)phenyl]4-ethylcyclohexane, 1,1-bis[4-(4-aminobenzyl)phenyl]4-n-propylcyclohexane, 1,1-bis [4-(4-aminobenzyl) phenyl]4-n-butylcyclohexane, 1,1-bis [4-(4-aminobenzyl) phenyl]4-n-pentylcyclohexane; 1,1-bis [4-(4-aminobenzyl)phenyl] cyclohexane, 1,1-bis [4-(4-aminobenzyl) phenyl]-4-methylcyclohexane, 1,1-bis [4-(4-aminobenzyl)phenyl]-4-ethylcyclohexane, 1,1-bis[4-(4-aminobenzyl)phenyl]-4-propylcyclohexane, 1,1-bis[4-(4-aminobenzyl)phenyl]-4-butylcyclohexane, 1,1-bis[4-(4-aminobenzyl)phenyl]-4-pentylcyclohexane, 1,1-bis[4-(4-aminobenzyl)phenyl]-4-hexylcyclohexane, 1,1-bis[4-(4-aminobenzyl)phenyl]-4-heptylcyclohexane, 1,1-bis[4-(4-aminobenzyl)phenyl]-4-octylcyclohexane, 1,1-bis[4-(4-aminobenzyl)phenyl]methane.

These compounds may be used alone or in combination of two or more compounds. And, diamines are not limited to these constitutions if the present object being attained.

As tetracarboxylic dianhydride, it is preferable to use cyclobutane tetracarboxylic dianhydride in a proportion of 20 mol % or more. More preferably, the proportion is 20 to 79 mol %. In the case of above 79 mol %, there is a tendency to occur image sticking of both sides.

It is possible to use jointly aromatic tetracarboxylic dianhydrides, alicyclic tetracarboxylic dianhydrides and aliphatic tetracarboxylic dianhydrides, unless they damage the characteristics of the invention.

Concretely, the following aromatic tetracarboxylic dianhydrides may be mentioned:

aliphatic and alicyclic tetracarboxylic dianhydrides such as ethylene tetracarboxylic dianhydride, decahydronaphtalene-1,4,5,8-tetracarboxylic dianhydride, 4,8-dimethyl-1,2,3,5,6,7-hexahydronaphtalene-1,2,5,6-tetracarboxylic dianhydride, cyclopentane-1,2,3,4-tetracarboxylic dianhydride, butane-1,2,3,4-tetracarboxylic dianhydride, bicyclo(2,2,2)-oct(7)-ene-2,3,5,6-tetracarboxylic dianhydride, cyclohexane-1,2,5,6-tetracarboxylic dianhydride, 3,3'-bicyclohexyl-1,1',2,2'-tetracarboxylic dianhydride, 2,3,5-tricarboxy cyclopentyl acetic dianhydride, 5-(2,5-dioxotetrahydrofural)-3-methyl-3-cyclohexene-1,2-dicarboxylic dianhydride, 1,3,3a,4,5,9b-hexahydro-5-tetrahydro-2,5-dioxo-3-furanyl)-naphtho[1,2,c]-furan-1,3-dione, 3,5,6-tricarboxynorbornane-2-acetic dianhydride, 2,3,4,5-tetrahydrofuran tetracarboxylic dianhydride;

aromatic tetracarboxylic dianhydrides such as 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxyphenoxy)diphenylsulfidedianhydride, 4,4'-bis (3,4-dicarboxyphenoxy) diphenyl sulfone dianhydride, 4,4'-bis (3,4-dicarboxyphenoxy) diphenyl propane dianhydride, 3,3',14,4'-perfluoropyridene diphthalic dianhydride, 3,3',4,4'-biphenyl tetracarboxylic dianhydride, bis(phathalic) phenyl sulphine oxide dianhydride, p-phenylene-bis(triphenyl phthalic) dianhydride, m-phenylene-bis(triphenyl phathalic) dianhydride, bis(triphenyl phathalic)-4,4'-diphenyl ether dianhydride, bis(triphenyl phathalic)-4,4'-diphenyl methane dianhydride and pyromellitic dianhydride.

These compounds may be used alone or in combination of two or more compounds.

Further, in a composition for a liquid crystal aligning film according to the invention, an amino silicone compound or a diamino silicone compound may be introduced in order to increase adhesion onto a substrate.

As amino silicone compounds, there may be mentioned para-aminophenyl trimethoxy silane, para-aminophenyl triethoxy silane, meta-aminophenyl trimethoxy silane, meta-aminophenyl triethoxy silane, aminopropyl trimethoxy silane and aminopropyl triethoxy silane.

As diamino silicone compounds, there may be mentioned 1,3-bis(3-aminopropyl)-1,1,1-tetraphenyl siloxane, 1,3-bis (3-aminopropyl)-1,1,1-tetramethyl disiloxane and 1,3-bis(4-aminobutyl)-1,1,1-tetramethyl disiloxane.

N,N-dimethyl formamide, N,N-dimethyl acetamide, N-methyl-2-pyrolidone, dimethyl sulphoxide, hexamethyl phosphoramide, phenol, tetrahydrofuran, dioxane, γ-butyrolactone etc. are preferable as polar organic solvents used in carrying out reaction to obtain a polymer, a resin component for the liquid crystal aligning film according to the invention, wherein two or more solvents maybe used jointly.

Further, it is possible to use conventional solvents such as 2-alkoxy ethanol type, carbitol type, toluene and xylene etc. together with these polar organic solvents, in such a range that solubility of polyimide resin or its precursor being not lowered.

Further, it is also possible to use polymers such as polyamic acids, polyimides, polyesters, polyamides and acrylic polymers etc. within a range not damaging characteristics of the present polymers.

The liquid crystal aligning film according to the invention is converted to polyimide by heating at 100 to 400° C. and/or treating chemically with a dehydrating agent such as acetic anhydride etc. The liquid crystal display element is prepared by arranging an electrode at a side against liquid crystals on a substrate for a liquid crystal displays and forming a liquid crystal aligning film on the said substrate and the electrode.

Forming of polyimide layer according to the invention on the liquid crystal substrate is carried out by applying the above-mentioned composition for liquid crystal aligning film on the glass substrate with the already formed transparent electrode such as ITO (Indium Tin Oxide) etc. and thereafter drying or dehydrating for ring-closure to a polyimide layer. As applying methods, there may be mentioned a printing method, a sintering method and a blowing method etc. Dehydrating temperature for ring-closure can be optionally selected within a range of 100 to 400° C., preferably 150 to 330° C. Further, heating time is 1 minute to 6 hours, preferably 1 minute to 3 hours.

In order to improve adhesion with the glass substrate, a coupling agent such as a silane coupling agent and a titanium coupling agent may be used jointly in the polyimide layer of the present aligning film.

The thus formed polyimide layer is used as a liquid aligning film by rubbing the surface. It is possible to obtain a liquid crystal display element by any known method with use of the liquid crystal display substrate having the liquid crystal aligning film.

As liquid crystals used for a liquid crystal display element, fluorine-type liquid crystals are preferable but not particularly limited to them such as in the case of liquid crystals mixed with liquid crystals of high dielectric anisotropy other than fluorine-type ones.

Generally, as to the identical fluorine-type liquid crystals, if liquid crystals having higher driving voltage (lower dielectric anisotropy ($\Delta\epsilon$)) are used, stained display unevenness due to water washing is difficultly formed even by using the identical aligning film, and also if liquid crystals having lower driving voltage (dilectric anisotropy of 6 or more) are used, unevenness due to water washing tends to be eminent.

In the case that a composition for a liquid crystal aligning film according to the invention being made to a liquid crystal display element, of course, fluorine-type liquid crystals having less dielectric anisotropy are effective for improvement of the problems, but any eminent difference is difficultly occurred. However, since more clear difference appears by use of liquid crystals having dielectric anisotropy of above 6, it is still effective to combine such liquid crystals for making most of characteristics of a composition for a liquid crystal aligning film according to the invention.

The liquid crystal aligning film according to the invention can be used in a liquid crystal display element for a large-size display such as a STN mode, a TFT mode and an IPS mode etc.

If the composition for a liquid crystal aligning film according to the invention is used for the liquid crystal aligning film and the liquid crystal display element, unevenness due to water washing can be lowered, which in turn appears eminently particularly in the case of fluorine-type liquid crystals with dielectric anisotropy of 6 or more.

The invention is illustrated by the following Examples, but the range of the invention is not limited by these Examples.

Occurrence of Vth unevenness formed by water washing is determined as follows.

A glass substrate having a formed liquid crystal aligning film on an ITO electrode was subjected to rubbing treatment, and 0.01 ml of ultra pure water was dropped at four points per 4 cm×4 cm and let alone for 5 minutes. Thereafter, water drops were washed lightly with ethanol and then dried at 110° C. for 30 minutes to form a normally black TN panel with a twist angle of 90° and a cell thickness of 6 $\mu$m.

After pouring liquid crystals, direct current voltage by which traces of water drops being most violently seen was applied on the panel, and then presence or absence of water drops and shade of color were confirmed visually.

SYNTHETIC EXAMPLE 1

Into 100 ml four-necked flask equipped with a thermometer, a stirrer, an inlet for introducing raw materials and an inlet for introducing nitrogen gas, 1.395 g (7.04 mmol) of 4,4'-diaminodiphenyl methane, 1.697 g (7.04 mmol) of 4,4'-ethylene di-meta-toluidine and 94 g (7.04 mmol) of dehydrated N-methyl-2-pirrolidone were introduced, and stirred under dry nitrogen gas stream to dissolve them. While the temperature of the reaction series being maintained below 20° C., 1.535 g (7.04 mmol) of pyromellitic dianhydride and 1.380 g (7.04 mmol) of cyclobutane tetracarboxylic dianhydride were added and reacted for 15 hours, to obtain a solution of polymer A having a 1:1:1:1 molar ratio of 4,4'-diaminodiphenyl methane, 4,4'-ethylene di-meta-toluidine, pyromellitic dianhydride and cyclobutane tetracarboxylic dianhydride as well as a solid concentration of 6 wt %. Viscosity at that time was 72 mPa.s (with use of E type viscosimeter, 25° C.), and weight average molecular weight was 95 thousands (determined by gel permeation chromatography, and so forth).

SYNTHETIC EXAMPLE 2

By the same method in Synthetic Example 1 except for using 2,2'-dimethyl-4, 4'-diaminodiphenyl methane instead of 4,4'-ethylene di-meta-toluidine, a solution of polymer B having a 1:1:1:1 molar ratio of 4,4'-diaminodiphenyl methane, 2,2'dimethyl-4,4'-diaminodiphenyl methane, pyromellitic dianhydride and cyclobutane tetracarboxylic dianhydride as well as a solid concentration of 6 wt % was obtained. Viscosity at that time was 60 mPa.s (with use of E type viscosimeter, at 25° C.), and weight average molecular weight was 82 thousands.

SYNTHETIC EXAMPLE 3

By the same method in Synthetic Example 1 except for using 3,3'-dimethyl-4,4'-diaminodiphenyl methane or 3,3',5,5'-tetramethyl-4,4'-diaminodiphenyl methane instead of 4,4'-ethylene di-meta-toluidine, a solution of polymer C having a 1:1:1:1 molar ratio of 4,4'-diaminodiphenyl methane, 3,3 -dimethyl-4,4'-diaminodiphenyl methane, pyromellitic dianhydride and cyclobutane tetracarboxylic dianhydride as well as a solid concentration of 6 wt %, and also a solution of polymer D having a 1:1:1:1 molar ratio of 4,4'-diaminodiphenyl methane, 3,3',5,5'-tetramethyl-4,4'-diaminodiphenyl methane, pyromellitic dianhydride and cyclobutane tetracarboxylic dianhydride as well as a solid concentration of 6 wt % were obtained. Viscosity of the polymer C solution at that time was 58 mPa.s (with use of E type viscosimeter, at 25° C.) and weight average molecular weight was 72 thousands, as well as viscosity of the polymer D solution was 67 mPa.s (with use of E type viscosimeter, at 250° C.) and weight average molecular weight was 86 thousands.

SYNTHETIC EXAMPLE 4

By the same method in Synthetic Example 1 except for using only 4,4'-diaminodiphenyl methane as a diamino compound, a solution of polymer E having a 2:1:1 molar ratio of 4,4-diaminodiphenyl methane, pyromellitic dianhydride and cyclobutane tetracarboxylic dianhydride as well as a solid concentration of 6 wt % was obtained. Viscosity of the polymer E solution at that time was 65 mPa.s (with use of E type viscosimeter, at 25° C.), and weight average molecular weight was 115 thousands.

EXAMPLE

Solutions obtained in Synthetic Examples 1 to 4 were diluted to 3 wt % with 2-butoxy ethanol and applied on glass substrates with the formed transparent electrodes by a spinning coating method, and then converted into polyimides by heat treatment at 200° C. for 1 hour, so that thin films with film thickness of about 60 nm were formed (herein, polyimides obtained from polymers A, B, C, D and E being referred to A, B, C, D and E, respectively). The said polyimide thin films were subjected to rubbing treatments to make the aligning films. By using substrates with formed aligning films, the liquid crystal cells having a twist angle of nematic layer of 90° and a thickness of the liquid crystal layer of 6 μm were made. The specified liquid crystals were poured into the said liquid crystal cells and used for experiments after heat treated at 110° C. for 30 minutes.

In these experiments, two kinds of liquid crystals having different magnitudes of dielectric anisotropy were used. Compositions and physical properties of liquid crystals 1 and 2 are shown as follows.

Liquid crystal 1

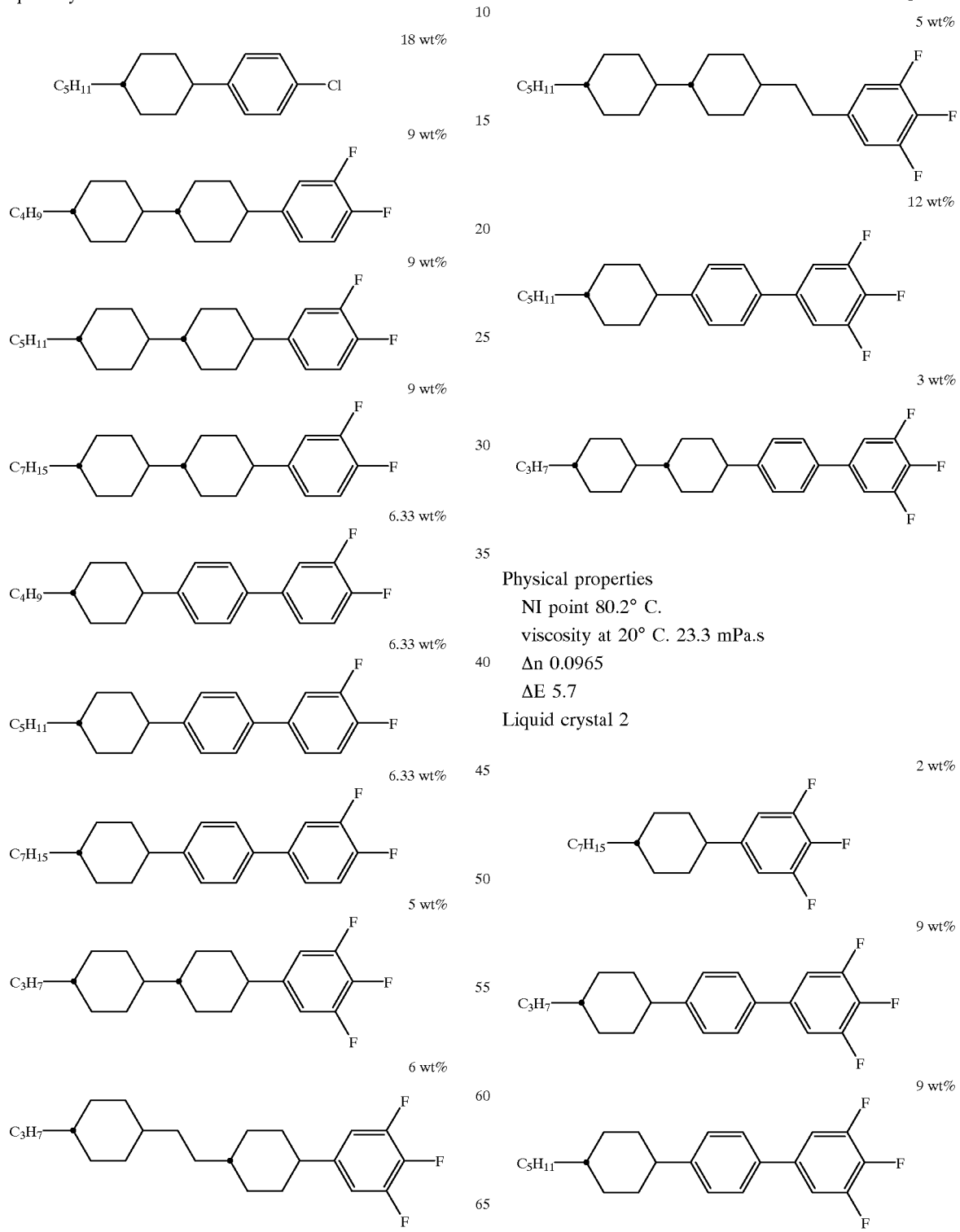

-continued

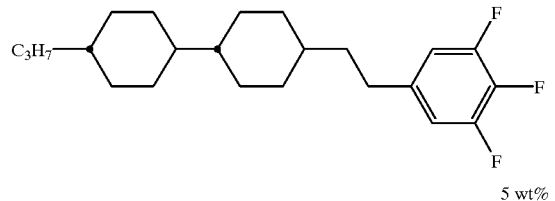

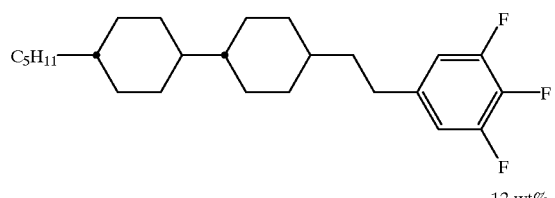

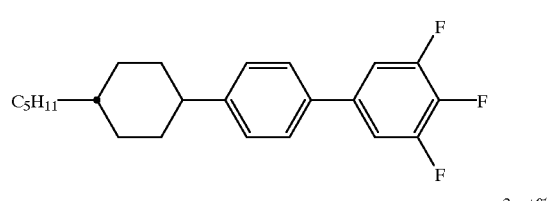

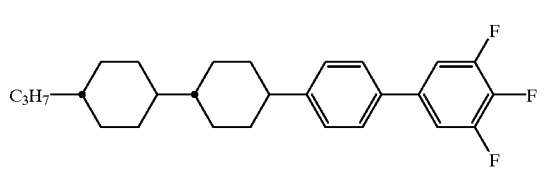

Physical properties
  NI point 80.2° C.
  viscosity at 20° C. 23.3 mPa.s
  Δn 0.0965
  ΔE 5.7

Liquid crystal 2

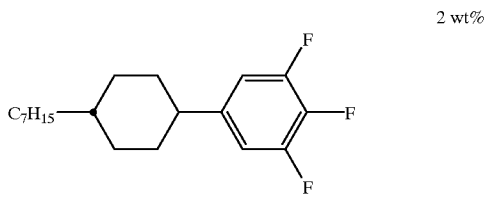

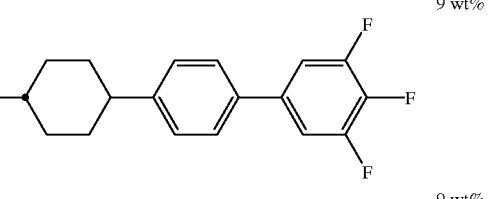

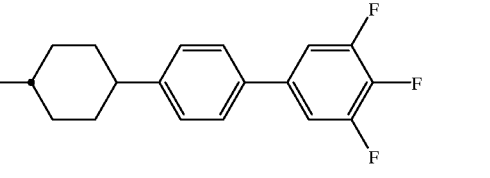

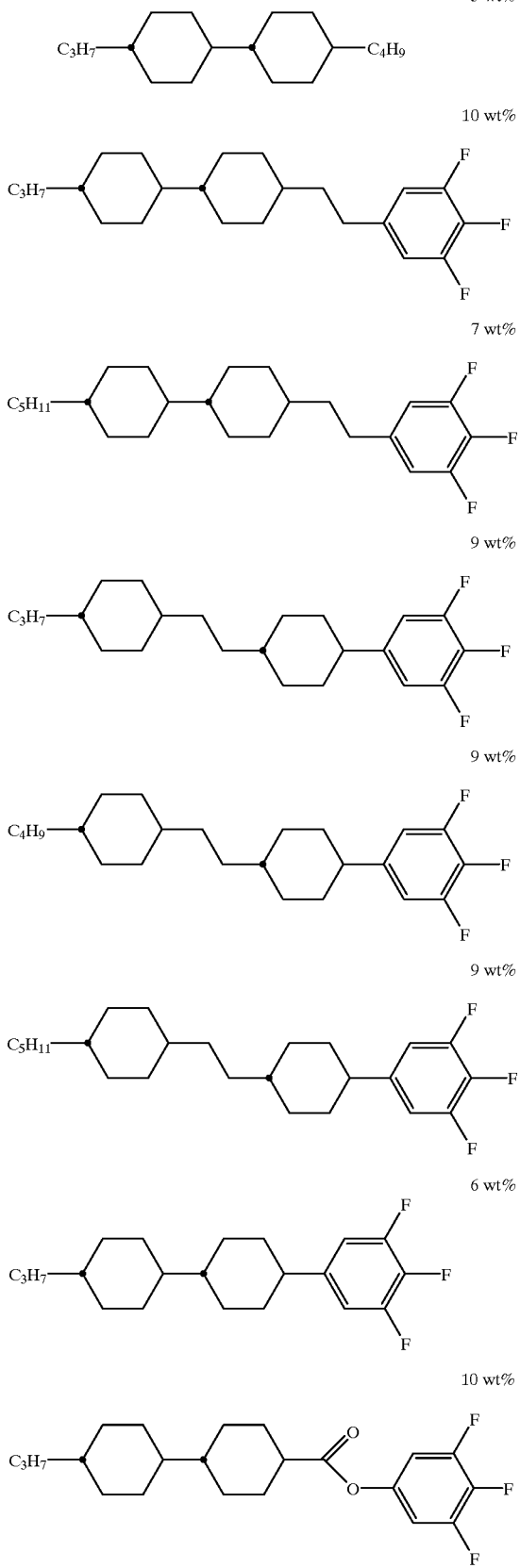

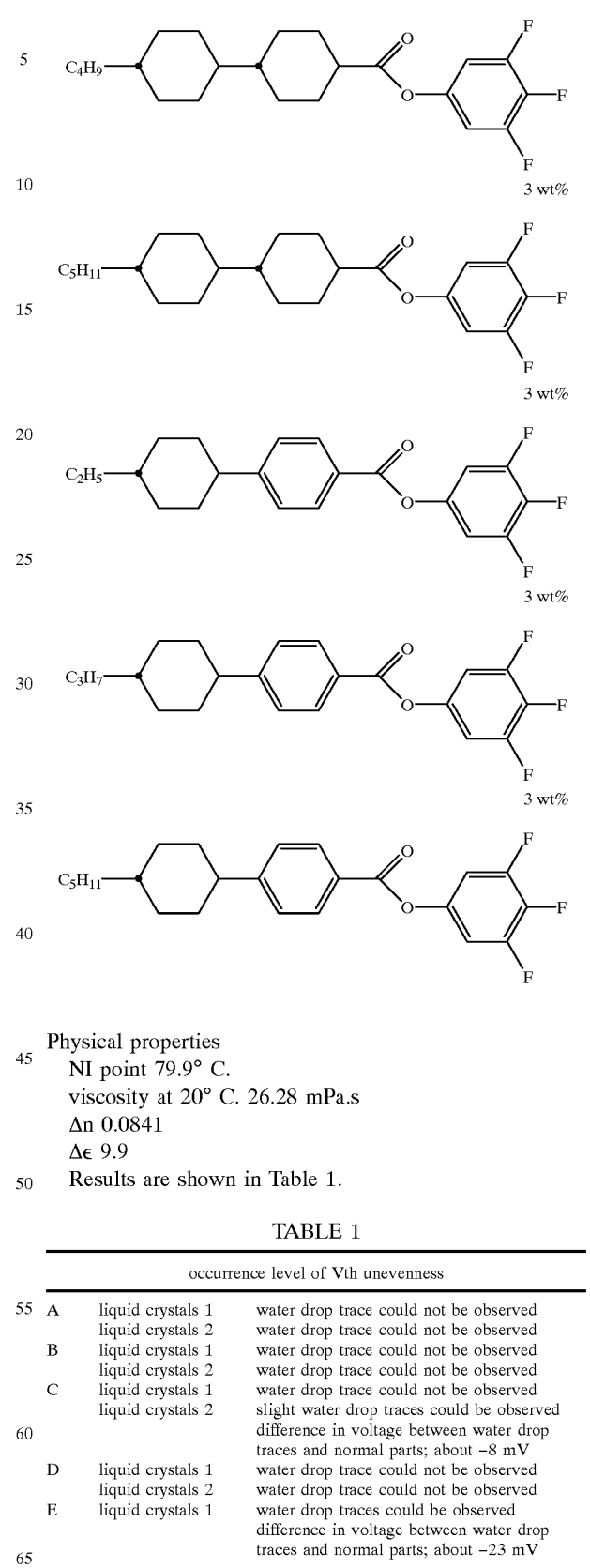

Physical properties
NI point 79.9° C.
viscosity at 20° C. 26.28 mPa.s
Δn 0.0841
Δε 9.9
Results are shown in Table 1.

TABLE 1

| | | occurrence level of Vth unevenness |
|---|---|---|
| A | liquid crystals 1 | water drop trace could not be observed |
| | liquid crystals 2 | water drop trace could not be observed |
| B | liquid crystals 1 | water drop trace could not be observed |
| | liquid crystals 2 | water drop trace could not be observed |
| C | liquid crystals 1 | water drop trace could not be observed |
| | liquid crystals 2 | slight water drop traces could be observed difference in voltage between water drop traces and normal parts; about −8 mV |
| D | liquid crystals 1 | water drop trace could not be observed |
| | liquid crystals 2 | water drop trace could not be observed |
| E | liquid crystals 1 | water drop traces could be observed difference in voltage between water drop traces and normal parts; about −23 mV |

TABLE 1-continued

| occurrence level of Vth unevenness | |
| --- | --- |
| liquid crystals 2 | clear water drop traces could be observed difference in voltage between water drop traces and normal parts; about −54 mV |

From the experiments, it is clear that the liquid crystal display elements can be obtained by using compositions for liquid crystal aligning films in Synthetic Examples 1 to 3, in which stainy display unevenness is difficultly produced after water drops being adhered on the surfaces of the aligning films.

Industrial Applicability

The liquid crystal display element with use of the compound according to the invention becomes more difficult to produce stainy display unevenness formed after water washing of the aligning film than the case that liquid crytals of higher dielectric anisotropy being used.

The liquid crystal display elements according to the invention are quite suitable particularly for active driving type liquid crystal display devices of high quality and large volume display, so that they may be used in liquid crystal display devices for terminals of OA machineries and display devices to be mounted in automobiles.

What is claimed is:

1. A polyimide for a liquid crystal aligning film formed from at least 20 mol % of a diamine, 20 to 79 mol % cyclobutane tetracarboxylic dianhydride, and the remainder mol % being pyromellitic dianhydridediamine, said diamine selected from the group consisting of 4,4'-diaminodiphenyl methane, 3,3'-dimethyl-4,4'-diaminodiphenyl methane, 2,2'-dimethyl-4,4'-diaminodiphenyl methane, 3,3',5,5'-tetramethyl-4,4'-diaminodiphenyl methane, 4,4'-ethylene di-meta-toluidine and mixtures thereof.

2. A liquid crystal aligning film which is formed from a polyimide for a liquid crystal aligning film according to claim 1.

3. Liquid crystal display having a liquid crystal aligning film according to claim 2.

4. A liquid crystal display element comprising a polyimide liquid crystal aligning film according to claim 1 on a substrate having transparent electrode thereon.

5. A liquid crystal display element according to claim 4, wherein said liquid crystal display element further includes a liquid crystal composition having a fluorine atom, said liquid crystal composition having dielectric anisotropy of 6 to 14.

* * * * *

UNITED STATES PATENT AND TRADEMARK OFFICE
CERTIFICATE OF CORRECTION

PATENT NO. : 6,084,058
DATED : July 04, 2000
INVENTOR(S) : Shizuo MURATA, et al.

It is certified that error appears in the above-identified patent and that said Letter Patent is hereby corrected as shown below:

Column 12, Claim 1, Line 5, change "dianhydridediamine" to --dianhydride--.

Signed and Sealed this

Tenth Day of April, 2001

*Attest:*

NICHOLAS P. GODICI

*Attesting Officer*  *Acting Director of the United States Patent and Trademark Office*